(12) United States Patent
Trainin

(10) Patent No.: US 8,630,195 B2
(45) Date of Patent: Jan. 14, 2014

(54) METHOD AND DEVICES FOR MULTIPLE STATION SOUNDING IN A WIRELESS LOCAL AREA NETWORK

(75) Inventor: Solomon B. Trainin, Haifa (IL)

(73) Assignee: Intel Corporation, Santa Clara, CA (US)

(*) Notice: Subject to any disclaimer, the term of this patent is extended or adjusted under 35 U.S.C. 154(b) by 339 days.

(21) Appl. No.: 12/843,663

(22) Filed: Jul. 26, 2010

(65) Prior Publication Data

US 2012/0020226 A1    Jan. 26, 2012

(51) Int. Cl.
*H04J 1/16* (2006.01)

(52) U.S. Cl.
USPC ........................................ 370/252; 455/456.1

(58) Field of Classification Search
USPC ......... 370/334, 349, 329, 330, 331, 252, 248; 455/456.1
See application file for complete search history.

(56) References Cited

U.S. PATENT DOCUMENTS

| 2009/0080355 | A1   | 3/2009  | Song     |         |
|---|---|---|---|---|
| 2009/0080365 | A1   | 3/2009  | Song et al. | |
| 2009/0080373 | A1   | 3/2009  | Song     |         |
| 2009/0196372 | A1 * | 8/2009  | Zhang et al. | 375/267 |
| 2010/0246467 | A1 * | 9/2010  | Song et al. | 370/312 |
| 2010/0260138 | A1 * | 10/2010 | Liu et al. | 370/330 |

OTHER PUBLICATIONS

"International Application Serial No. PCT/US2011/044767, International Preliminary Report on Patentability mailed Feb. 7, 2013", 6 pgs.

\* cited by examiner

*Primary Examiner* — Dady Chery
(74) *Attorney, Agent, or Firm* — Schwegman, Lundberg & Woessner, P.A.

(57) ABSTRACT

Embodiments of a method and apparatus for obtaining sounding measurements between an access point and a wireless station within a wireless local area network are described. Some embodiments relate to Wi-Fi networks and networks operating in accordance with one of the IEEE 802.11 standards. Some embodiments may allow an access point to request that multiple stations compute sounding measurements with minimal time delay between measurements. Other embodiments may be described and claimed.

20 Claims, 5 Drawing Sheets

METHOD AND DEVICES FOR MULTIPLE STATION SOUNDING IN A WIRELESS LOCAL AREA NETWORK

TECHNICAL FIELD

Various embodiments described herein relate to apparatus and methods associated with wireless local area network communication. Some embodiments relate to Wireless Fidelity (Wi-Fi) networks and networks operating in accordance with one of the IEEE 802.11 standards. Some embodiments relate to communications and data transmission between an access points (AP) and wireless local area network devices or stations (STAs).

BACKGROUND

In a wireless local area network it is occasionally useful to perform sounding measurements of the communications environment between the access point and the wireless stations. These sounding measurements may provide data for use in beamforming and multiple input multiple output (MIMO) antenna operations. It is often desirable for an access point to request sounding information from multiple stations in parallel in order to obtain this information while maintaining singular communication link conditions.

Currently, an access point may request a sounding from a station by sending an announce message followed by a null data packet (NDP) sounding message directed to that station. This procedure may be repeated for each station, which can be time consuming and inefficient and may result in an unacceptable delay between the sounding measurements performed at each of the stations.

Thus, there are general needs for apparatus and efficient methods for an access point to request that multiple stations compute sounding measurements with minimal time delay between measurements.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
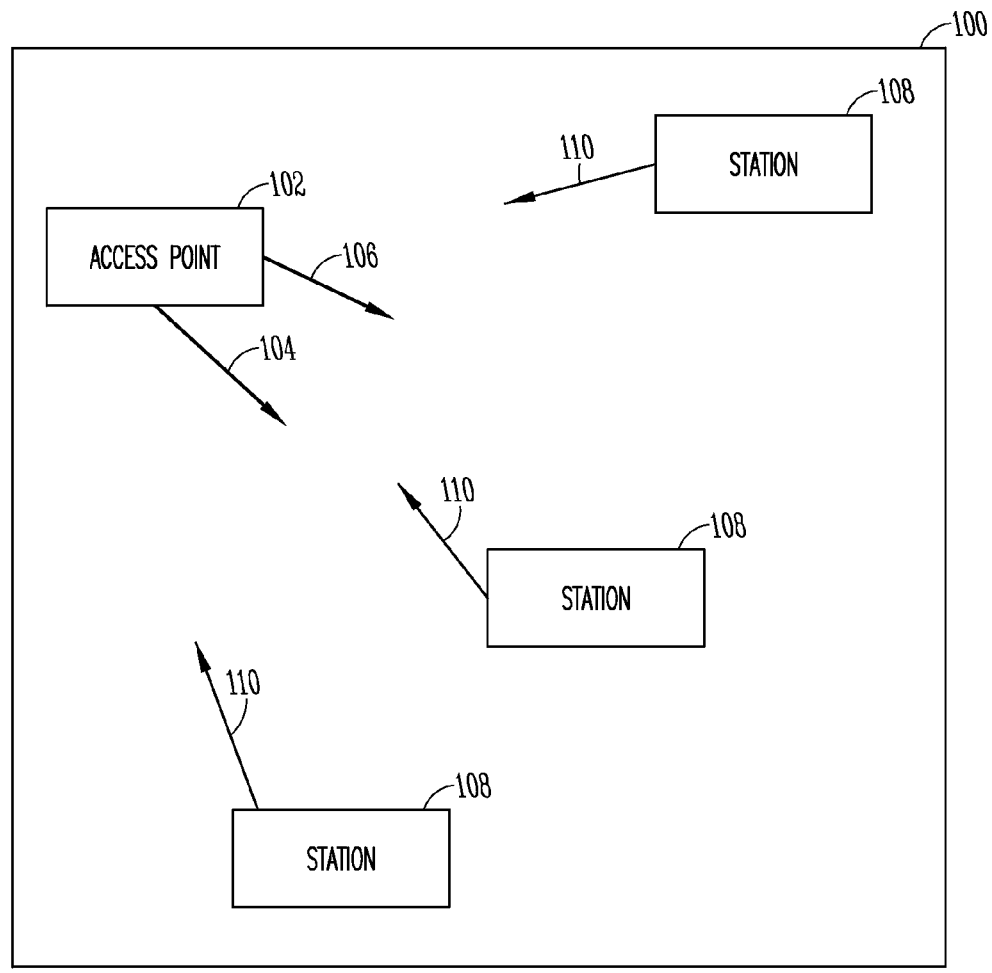
FIG. 1 illustrates an access point and wireless stations in a wireless local area network, in accordance with some embodiments.

FIG. 1 illustrates an access point and wireless stations in a wireless local area network in accordance with some embodiments. Wireless network 100 includes an access point (AP) 102 and one or more stations (STAs) 108. In some embodiments, the wireless network 100 may be a Wi-Fi network in accordance with specific communication standards, such as the Institute of Electrical and Electronics Engineers (IEEE) standards, including IEEE 802.11-2007 and/or 802.11(n) standards and/or proposed specifications for WLANs including the IEEE 802.11(ac) standard.

In the wireless network 100 it may be useful to perform sounding measurements of the communications environment between the AP 102 and the STAs 108. These sounding measurements may provide data for use in beamforming and multiple input multiple output (MIMO) antenna operations.

In some embodiments, AP 102 may request soundings from STAs 108 by transmitting an announce message 104 and a null data packet (NDP) sounding message 106, which may be received by STAs 108. In response, the STAs 108 may compute sounding measurements 110 and transmit them back to AP 102. In some embodiments, the announce message 104 may precede the NDP sounding message 106 or the NDP sounding message 106 may precede the announce message 104.

In some embodiments, it may be advantageous for an AP 102 to request sounding information from multiple STAs 108 in parallel in order to minimize the effect of changing communication link conditions. This may be useful, for example, in the case of beamforming on the downlink (DL) multiuser (MU) MIMO transmission. In some embodiments, this may be accomplished by transmitting the announce message 104 as a broadcast message containing the unicast recipient addresses (RAs) of the STAs 108 for which sounding is desired. In some embodiments, this may be accomplished by transmitting the announce message 104 as a multicast message containing the group address for the group of STAs 108 for which sounding is desired. In some embodiments, this may be accomplished by transmitting the announce message 104 as a multicast message associating a list of unicast RAs of the STAs 108 for which sounding is desired with a multicast group address.

In some embodiments, the order of the RAs in the announce message 104 may determine the order in which the STAs 108 respond with sounding measurements 110.

Although three STAs 108 are presented for illustrative purposes, any number of STAs may be employed.

Figure 2:
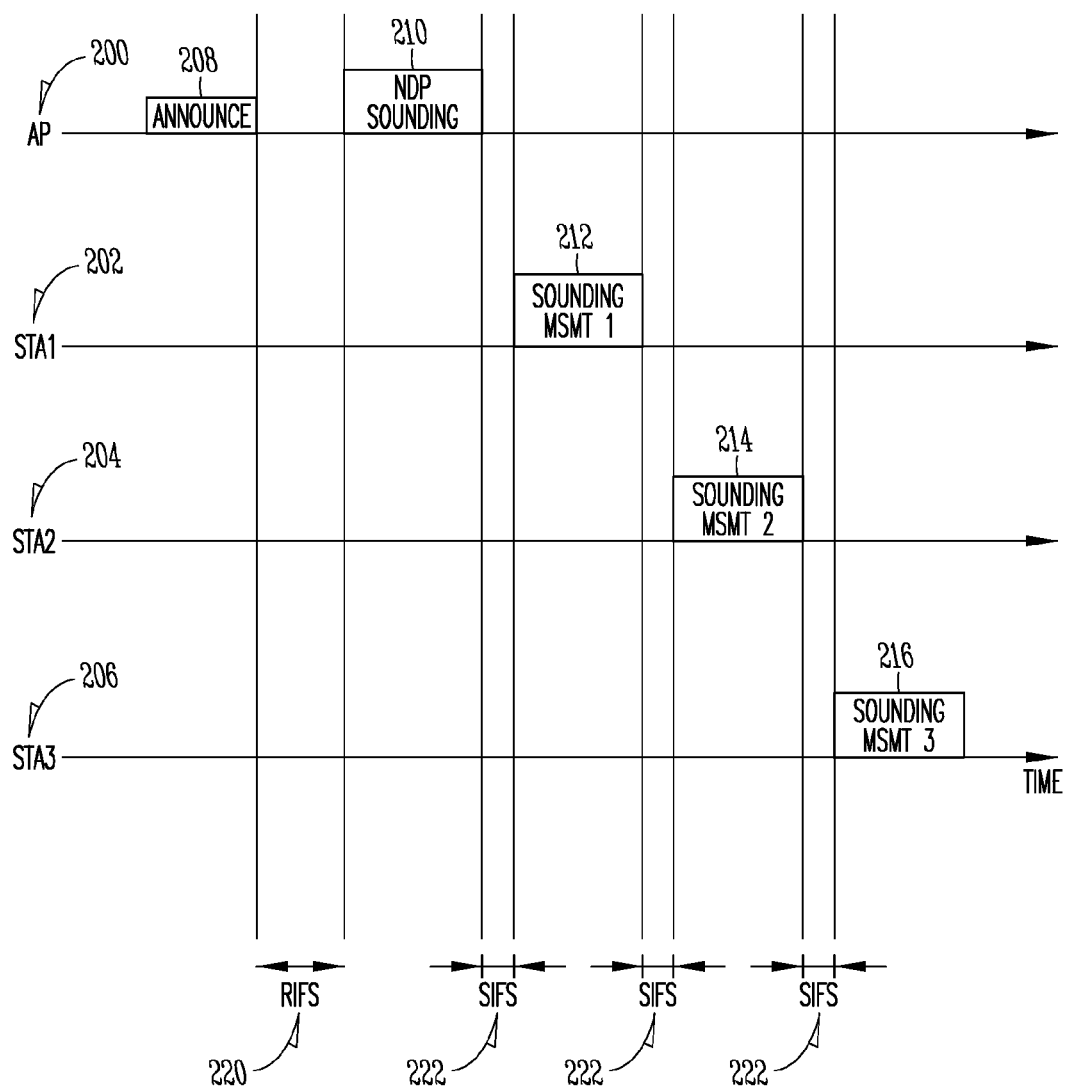
FIG. 2 illustrates a transmission timeline between the access point and the wireless stations, in accordance with some embodiments.

FIG. 2 illustrates a transmission timeline between the access point and the wireless stations, in accordance with some embodiments. AP 200 transmits an announce message 208 and an NDP sounding message 210. In some embodiments, the announce message 208 may precede the NDP sounding message 210 or the NDP sounding message 210 may precede the announce message 208. The time interval between the announce message 208 and the NDP sounding message 210 may be a reduced interframe spacing (RIFS) 220 as shown. In some embodiments, the time interval between the announce message 208 and the NDP sounding message 210 may be a short interframe spacing (SIFS) 222.

Stations STA1 202, STA2 204, and STA3 206 respond to the NDP sounding message 210 by computing and transmitting sounding measurements 212, 214 and 216. Although three STAs are presented for illustrative purposes, any number of STAs may be employed. The time interval between the sounding measurements 212, 214 and 216 may be a short interframe spacing (SIFS) 222.

Figure 3:
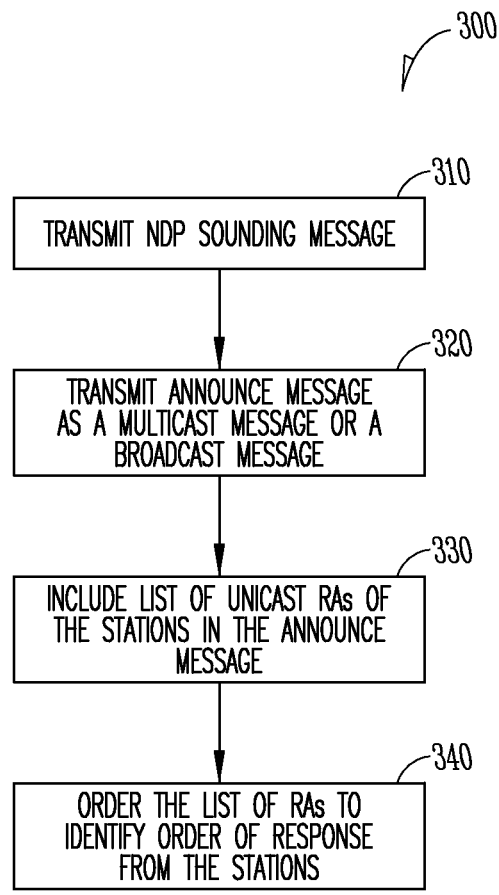
FIG. 3 illustrates a procedure for an access point to request sounding measurements, in accordance with some embodiments.

FIG. 3 illustrates a procedure for an access point to request sounding measurements, in accordance with some embodiments. Procedure 300 may be performed by an AP, such as AP 102 (FIG. 1). Operation 310 comprises transmitting an NDP sounding message from the AP to the STAs. Operation 320 comprises transmitting an announce message from the AP to the STAs. The announce message may be a multicast message or a broadcast message. Operation 330 comprises including a list of unicast RAs of the STAs for which a sounding measurement is requested in the announce message. Operation 340 comprises ordering the list of RAs to identify the order of response from the STAs.

Figure 4:
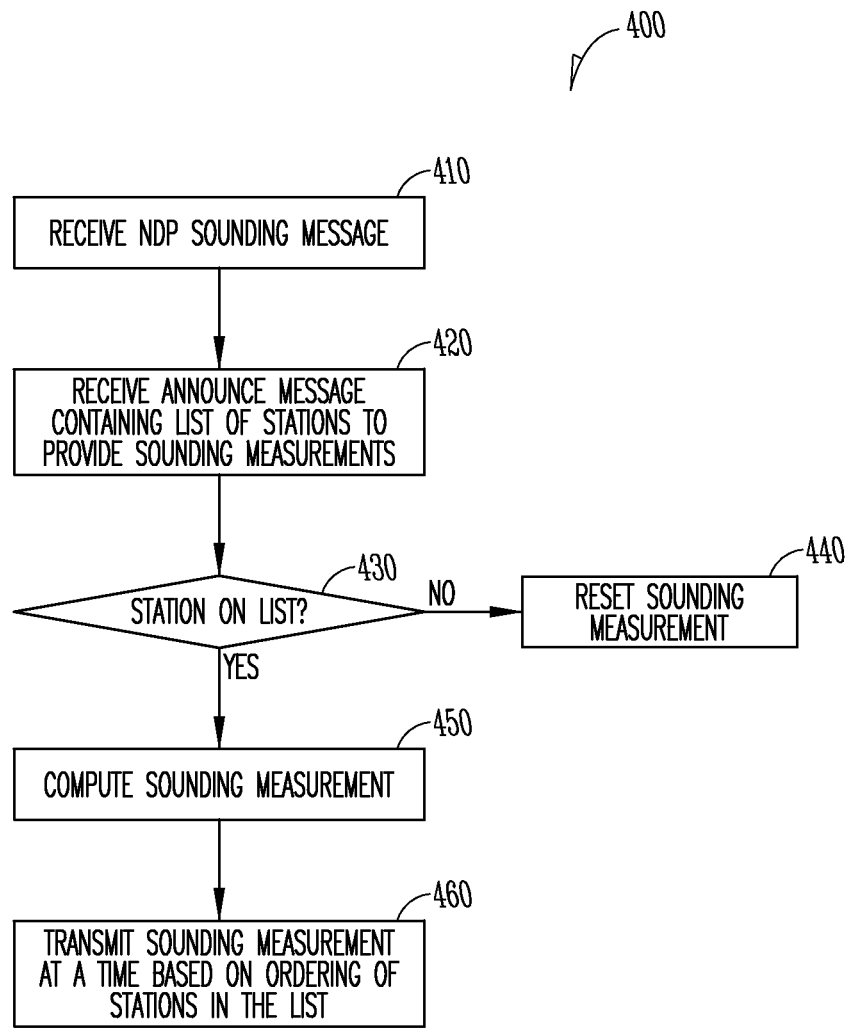
FIG. 4 illustrates a procedure for a wireless station to respond to a sounding request, in accordance with some embodiments.

FIG. 4 illustrates a procedure for a wireless station to respond to a sounding request, in accordance with some embodiments. Procedure 400 may be performed by an STA, such as STA 108 (FIG. 1). Operation 410 comprises receiving an NDP sounding message from the AP. Operation 420 comprises receiving an announce message from the AP containing a list of STAs to provide sounding measurements. Operation 430 comprises determining if the STA is on the list. Operation 440 comprises resetting the sounding measurement if the STA is not on the list. Operation 450 comprises computing a sounding measurement if the STA is on the list. Operation 460 comprises transmitting the sounding measurement at a time based on the ordering of the STAs in the list. In some embodiments, the time of transmission is determined such that a short interframe spacing (SIPS) is achieved between the sounding measurement transmissions from each STA.

Although the individual operations of procedures 300 and 400 are illustrated and described as separate operations, one or more of the individual operations may be performed concurrently, and nothing requires that the operations be performed in the order illustrated. Furthermore, some operations may be optional.

Figure 5:
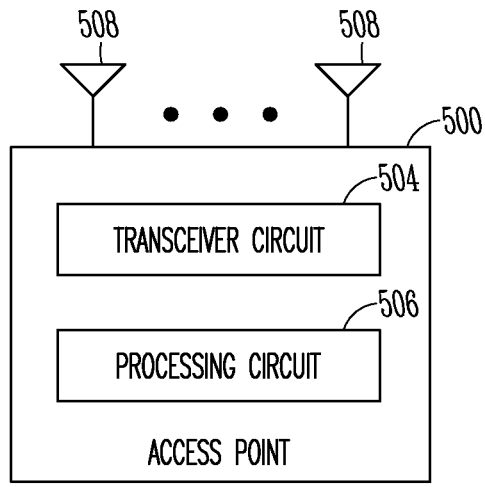
FIG. 5 illustrates a functional block diagram of an access point, in accordance with some embodiments.

FIG. 5 illustrates a functional block diagram of an access point, in accordance with some embodiments. Access point 500 may include a transceiver circuit 504 and a processing circuit 506. Transceiver circuit 504 may be coupled to one or more antennas 508 for transmitting and receiving messages from wireless stations, such as STA 108 (FIG. 1). In accordance with some embodiments, the AP 500 may be configured to operate in a wireless local area network. In some embodiments, the wireless local area network may be a Wi-Fi network operating in accordance with the 802.11 standard.

In these embodiments, the processing circuit 506 may determine a plurality of STAs which are to provide a sounding measurement. In these embodiments, the transceiver circuit 504 may transmit an NDP sounding message and an announce message. The announce message may identify the plurality of STAs which are to provide a sounding measurement in response to the NDP sounding message. In some embodiments, the transceiver circuit 504 may transmit the NDP sounding message prior to the announce message.

In some embodiments, the transceiver circuit 504 may transmit the announce message as a multicast message. In some embodiments, the transceiver circuit 504 may transmit the announce message as a broadcast message. In some embodiments, the announce message may contain a list of unicast recipient addresses (RAs) of the STAs.

In some embodiments, the processing circuit 506 may further order the list of RAs to identify an order of the response sounding measurements of the STAs.

Figure 6:
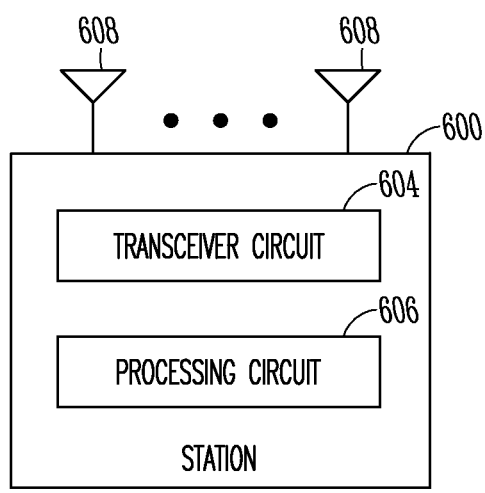
FIG. 6 illustrates a functional block diagram of a wireless station, in accordance with some embodiments.

FIG. 6 illustrates a functional block diagram of a wireless station in accordance with some embodiments. Station 600 may include a transceiver circuit 604 and processing circuit 606. Transceiver circuit 604 may be coupled to one or more antennas 608 for transmitting and receiving messages from access points, such as AP 102 (FIG. 1). In accordance with some embodiments, the STA 600 may be configured to operate in a wireless local area network. In some embodiments, the wireless local area network may be a Wi-Fi network operating in accordance with the 802.11 standard.

In these embodiments, the transceiver circuit 604 may receive an NDP sounding message and an announce message. The announce message may identify a plurality of STAs which are to provide a sounding measurement in response to the NDP sounding message. In some embodiments, the transceiver circuit 604 may receive the NDP sounding message prior to the announce message.

In these embodiments, the processor circuit 606 may recognize that the STA is one of the plurality of STAs identified in the announce message. In some embodiments, the processor circuit 606 may further compute a sounding measurement in response to the recognition.

In some embodiments, the processing circuit 606 may further recognize that the STA is not one of the plurality of STAs identified in the announce message and may then reset the sounding measurement in response to the recognition.

In some embodiments the transceiver circuit 604 further transmits a computed sounding measurement. In some embodiments, the transceiver circuit 604 transmits the sounding measurement at a time based on the ordering of the STAs in the announce message. In some embodiments, the time of transmission is determined such that a short interframe spacing (SIPS) is achieved between the sounding measurement transmissions from each STA.

In some embodiments, STA 600 may be part of a portable wireless communication device, such as a personal digital assistant (PDA), a laptop or portable computer with wireless communication capability, a web tablet, a wireless telephone, a wireless headset, a pager, an instant messaging device, a digital camera, an access point, a television, a smart phone, or other device that may receive and/or transmit information wirelessly.

Antennas 508 and 608 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, antennas 508 and 608 may be effectively separated to take advantage of spatial diversity and the different channel characteristics that may result between each of antennas 508 and 608.

Although AP 500 and STA 600 are illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application-specific integrated circuits (ASICs), radio-frequency integrated circuits (RFICs) and combinations of various hardware and logic circuitry for performing at least the functions described herein. In some embodiments, the functional elements of AP 500 and STA 600 may refer to one or more processes operating on one or more processing elements.

Embodiments may be implemented in one or a combination of hardware, firmware and software. Embodiments may also be implemented as instructions stored on a computer-readable storage medium, which may be read and executed by at least one processor to perform the operations described herein. A computer-readable medium may include any tangible medium for storing in a form readable by a machine (e.g., a computer). For example, a computer-readable medium may include read-only memory (ROM), random-access memory (RAM), magnetic disk storage media, optical storage media, and flash-memory devices.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method performed by an access point, the method comprising:
    transmitting a null data packet (NDP) sounding message; and
    transmitting an announce message, the announce message identifying a plurality of stations (STAs) in a listing of stations, the listing of stations providing respective identifiers for the plurality of STAs which are to provide a sounding measurement in response to the NDP sounding message, wherein the sounding measurement provided from the plurality of STAs in response to the NDP sounding message is transmitted at respective times determined by the plurality of STAs respectively, and wherein the only value of the announce message used by the plurality of STAs to determine the respective times for transmitting the sounding measurement is an ordering of the respective identifiers provided by the listing of stations.

2. The method of claim 1, wherein the NDP sounding message is transmitted prior to the announce message.

3. The method of claim 1, wherein the method is performed in a wireless network operating in accordance with an IEEE 802.11(ac) standard, and
    wherein the method further comprises performing a downlink multi-user multi-input multi-output transmission based on the sounding measurement.

4. The method of claim 1, wherein the announce message is a broadcast message or a multicast message.

5. The method of claim 1, wherein the listing of stations in the announce message contains a list of unicast recipient addresses (RAs) of the STAs.

6. The method of claim 5, further comprising ordering the list of unicast RAs to identify an order of the sounding measurement responses of the STAs.

7. The method of claim 6, further comprising receiving the response sounding measurements from one or more of the plurality of STAs in response to the transmission of the announce message.

8. The method of claim 7, wherein the receiving of the response sounding measurements is in the order specified in the list.

9. A method performed by a station (STA), the method comprising:
    receiving a null data packet (NDP) sounding message at the STA;
    receiving an announce message, the announce message identifying a plurality of stations (STAs) in a listing of stations providing respective identifiers for the plurality of STAs which are to provide a sounding measurement in response to the NDP sounding message;
    recognizing that the STA is one of the plurality of STAs identified in the listing of stations in the announce message based on an identifier of the STA;
    computing a sounding measurement in response to the recognition; and
    determining timing for transmission of the computed sounding measurement based on the listing of STAs, wherein the only value of the announce message used by the STA to determine the timing for transmission of the computed sounding measurement is an ordering of the identifier of the STA within the respective identifiers for the plurality of STAs.

10. The method of claim 9, further comprising:
    recognizing that the STA is not one of the plurality of STAs identified in the announce message; and
    resetting the sounding measurement in response to the recognizing that the STA is not one of the plurality of STAs identified in the announce message.

11. The method of claim 9, wherein the method is performed in a wireless network in accordance with an IEEE 802.11(ac) standard, and
    wherein the method further comprises transmitting the computed sounding measurement.

12. The method of claim 11, wherein determining timing for transmission of the computed sounding measurement based on the listing of stations includes determining a timing of the transmitting based on an ordering of a list of the plurality of STAs contained in the announce message.

13. The method of claim 9, wherein the null data packet (NDP) sounding message is received by the STA prior to the announce message being received by the STA.

14. An access point to operate in a wireless network, the access point comprising:
    a processing circuit to determine a plurality of stations (STAs) which are to provide a sounding measurement; and
    a transceiver circuit to transmit a null data packet (NDP) sounding message and an announce message, the announce message identifying the plurality of stations (STAs) in a listing of stations, the listing of stations providing respective identifiers for the plurality of STAs which are to provide a sounding measurement in response to the NDP sounding message, wherein the sounding measurement provided from the plurality of STAs in response to the NDP sounding message is transmitted at respective times determined by the plurality of STAs respectively, and wherein the only value of the announce message used by the plurality of STAs to determine the respective times for transmitting the sounding measurement is an ordering of the respective identifiers provided by the listing of stations.

15. The access point of claim 14, wherein the transceiver circuit transmits the NDP sounding message prior to the announce message.

16. The access point of claim 14, wherein the access point is configured to operate in accordance with an IEEE 802.11 (ac) standard, and
    wherein the transceiver circuit is further configured to perform a downlink multi-user multi-input multi-output transmission based on the sounding measurement.

17. The access point of claim 14, wherein the transceiver circuit transmits the announce message as a broadcast message or a multicast message.

18. The access point of claim 14, wherein the listing of stations in the announce message contains a list of unicast recipient addresses (RAs) of the STAs.

19. The access point of claim 18, wherein the processing circuit further orders the list of unicast RAs to identify an order of the sounding measurement responses of the STAs.

20. A method performed by an access point, the method comprising:

transmitting a null data packet (NDP) sounding message; and transmitting an announce message, the announce message identifying a plurality of stations (STAs) in a listing of stations, the listing of stations providing an ordered list of respective identifiers for the plurality of STAs and indicating the plurality of stations which are to provide a sounding measurement in response to the NDP sounding message, wherein the NDP sounding message is transmitted before the announce message, wherein the only value of the announce message used by the plurality of STAs to determine timing among the plurality of STAs for transmitting the sounding measurement in response to the NDP sounding message is an ordering of the respective identifiers provided by the listing of stations.

* * * * *